United States Patent [19]
Diamondis

[11] Patent Number: 5,319,208
[45] Date of Patent: Jun. 7, 1994

[54] FORCED AIR FLOW RADON DETECTOR HAVING ELECTRICALLY CONDUCTIVE INLET AND EXHAUST FILTER

[76] Inventor: Peter J. Diamondis, 1155 Redwood Rd., Merritt Island, Fla. 32952

[21] Appl. No.: 679,911

[22] Filed: Apr. 3, 1991

[51] Int. Cl.⁵ .............................................. G01T 7/04
[52] U.S. Cl. ................... 250/435; 250/255; 250/370.02; 250/380; 250/432 R
[58] Field of Search ............... 250/255, 253, 380, 384, 250/374, 370.02, 432 R, 435, 336.1, 370.06, 304

[56] References Cited

U.S. PATENT DOCUMENTS

| | | | |
|---|---|---|---|
| 2,499,830 | 3/1950 | Malloy | 250/374 |
| 4,362,941 | 12/1982 | Castleman et al. | 250/381 |
| 4,451,736 | 5/1984 | Cameron | 250/376 |
| 4,604,634 | 8/1986 | Feigt et al. | 346/160 |
| 4,609,823 | 9/1986 | Berger et al. | 250/370 |
| 4,853,536 | 8/1989 | Dempsey et al. | 250/253 |
| 4,871,914 | 10/1989 | Simon et al. | 250/370.02 |
| 4,894,535 | 1/1990 | Madnick et al. | 250/255 |
| 5,026,986 | 6/1991 | Hurst | 250/255 |
| 5,235,190 | 8/1993 | Tucker | 250/435 |

FOREIGN PATENT DOCUMENTS

WO87/07033 11/1987 PCT Int'l Appl. .

OTHER PUBLICATIONS

Honeywell "At Ease" Radon Monitor Brochure Dec. 1988.
"On Improving the Validity of Wire Screen 'Unattached' Fraction Rn Daughter Measurements", by Mukund Ramamurthi and Philip K. Hope, *Health Physics*, vol. 56, No. 2 (Feb.), 1989, pp. 189-194.
"Measurement of the Uncombined Fraction of Radon Daughters with Wire Screen", by Andreas C. George; Health and Safety Laboratory, U.S. Atomic Energy Commission, New York, N.Y. (identified as a manuscript received Jan. 28, 1972).

*Primary Examiner*—Constantine Hannaher
*Assistant Examiner*—Drew A. Dunn
*Attorney, Agent, or Firm*—Charles Wands

[57] ABSTRACT

A radon gas detector comprises a housing having an air inlet port leading to an interior, a radiation detection (e.g. alpha particle measurement) chamber and an air exhaust port leading from the interior chamber to the exterior of the housing. The chamber is closed to the entry of ambient light by a pair of light-obstructing baffles that respectively couple the air inlet and air exhaust ports to the interior chamber. Coupled with the air inlet port is a first removable, electrically conductive mesh filter. Coupled with the air exhaust port is a second, fixed electrically conductive mesh filter. Since each mesh filter is electrically conductive, it readily traps radon daughter products before they can enter into the interior chamber. Also, because of its mesh configuration, each filter readily permits substantial air flow. To measure radon concentration in the air being circulated through detector, a radiation (e.g. alpha particle responsive) detector in the form of an open photodiode array is disposed within the interior chamber, so as to be exposed to incident alpha particle emissions from the radon gas as it is drawn through the chamber by the operation of the exhaust fan. Daughter product concentration can be derived by a first measurement with the intake filter in place and then a second measurement with the intake filter removed. The difference between the two measurements yields daughter product concentration in working level units.

14 Claims, 2 Drawing Sheets

FORCED AIR FLOW RADON DETECTOR HAVING ELECTRICALLY CONDUCTIVE INLET AND EXHAUST FILTER

FIELD OF THE INVENTION

The present invention relates to radon gas measurement devices, and is particularly directed to a radon gas detector employing an alpha particle detecting photodiode array located within a dark detector chamber, through which air is actively circulated using a low volume fan, the air being filtered at intake and exhaust ports by means of electrically conductive mesh filters to exclude entry of radon daughter products.

BACKGROUND OF THE INVENTION

Radon is an invisible, odorless and chemically inactive radioactive gas that is produced by the decay of uranium ore, such as radium, actinium, or thorium. Radon undergoes a decay process which produces several high energy alpha particles and solid, radioactive decay products, termed daughter products. During the radon decay process, Rn222 decays by emitting an alpha particle having an energy of 5.5 MeV (million electron volts) to produce radioactive daughter Po218. Po218 then decays by emitting an alpha particle having an energy of 6.0 MeV to produce radioactive daughter Po214. Po214 subsequently decays by emitting an alpha particle having an energy of 7.7 MeV to produce radioactive daughter Po210. Po210 which has a half life of 20 years, eventually decays by emitting an alpha particle having an energy of 5.3 MeV.

The inhalation of radon and its radioactive decay products causes irradiation of lung tissue. Consequently, prolonged exposure to high concentrations of radon significantly increases the risk of developing cancer. It has been reported that the U.S. Environmental Protection Agency estimates exposure to naturally occurring radon leads to 21,000 lung cancer deaths nationwide each year, making radon the nation's primary environmental health threat and second only to cigarette smoking as a cause of fatal lung cancer.

Until recently, it was believed that dangerous concentrations of radon occurred primarily in uranium mines or laboratories containing large quantities of uranium. However, recent studies indicate that radon produced by the decay of radioactive ore in the rock and soil migrates to the earth's surface and becomes trapped in homes, where indoor concentrations of radon eventually build up to dangerous levels, thereby creating a significant residential health hazard. Indeed, indoor radon is now believed to be a greater radiological hazard to the population than all other natural and manmade radiation sources combined. It has been estimated that between 6 and 9 million homes in the United States have radon levels above 4 pCi/l (pico Curies per liter of air), the level above which the Environmental Protection Agency urges remedial action.

The determination of whether a home is at risk due to unacceptably high concentrations of radon can be made only by actual measurement of air samples within the home. The tremendous volume of testing required to identify those homes which are at risk has created a need for a detector which possesses the following characteristics. First the measurement must be reasonably fast. One currently commercially marketed device, manufactured by Honeywell Inc., which relies on diffusion of ambient air past a radiation detection zone, suffers from a prolonged measurement period, requiring 24 to 48 hours to obtain a useful output. The instrument must also perform a high precision measurement. It should be relatively low cost in order to practically affordable and it should not require a skilled operator or the need for follow on laboratory analysis. In addition, the instrument should be capable of measuring radon concentration in pCi/l and radon daughter product concentration in working level (WL) units.

Currently available radon detectors include scintillation and photomultiplier detectors, solid state junction and surface barrier photodiode detectors, gas proportional detectors, alpha track detectors, and charcoal canisters. However, none of these radon detectors has all of the above mentioned features. The above mentioned Honeywell radon detector, which at least uses a relatively simple and compact open photodiode detector to sense alpha particle emission, depends on the relatively slow diffusion of sampled air into the detector chamber, which makes its response time inordinately long (in the order of 24 to 48 hours).

SUMMARY OF THE INVENTION

In accordance with the present invention, there is provided a new and improved radon detector which, by virtue of a novel construction, filtering and air flow control scheme, possesses all of the characteristics enumerated above, thereby providing a practical radon detector capable of providing an early warning to the user.

More particularly, the radon gas detector according to the present invention comprises a housing having an air inlet port leading to an interior, a radiation detection (e.g. alpha particle measurement) chamber and an air exhaust port leading from the interior chamber to the exterior of the housing. The interior chamber is closed to the entry of ambient light by means of a pair of light-obstructing baffle structures that respectively couple the air inlet and air exhaust ports to the interior chamber. The light obstructing baffle structure between the air inlet port and the interior chamber has n air passageway whose length is in excess of its widthwise dimension, so as to effectively prevent the entry of ambient light into the interior chamber by way of the air inlet port.

Coupled with the air inlet port is a first removable, electrically conductive mesh filter through which air entering the air inlet port passes in the course of its movement to the interior chamber. Similarly, coupled with the air exhaust port is a second electrically conductive mesh filter. Since each mesh filter is electrically conductive, it readily traps (ionic) radon daughter products before they can enter into the interior chamber. In addition, because of its mesh configuration, each filter readily permits substantial air flow (through the openings in the mesh). A metallic mesh filter having a mesh opening size of 10–20 microns may be used.

When air is drawn into the chamber under the control of a forced air movement device, such as an exhaust fan disposed in the air flow path through the exhaust port from the interior chamber, a substantial quantity of air per unit time can be actively circulated through the measurement chamber, thus significantly reducing the length of time required to obtain a meaningful measurement of radon concentration within the ambient air under test.

To measure radon concentration in the air being circulated through the interior chamber, a radiation (e.g. alpha particle responsive) detector in the form of an open photodiode array is disposed within said interior chamber, so as to be exposed to incident alpha particle emissions from the radon gas as it is drawn through the interior chamber by the operation of the exhaust fan.

In addition to the ability to measure radon concentration: based upon incidence of alpha particles upon the photodiode array, the present invention also has the capability of determining daughter product concentration. For this purpose, two measurements may be conducted. During the first measurement, the intake air filter is retained in place, so that the photodetector responds only to the presence of alpha particles from radon, and a measured count value provided by attendant processing circuitry will depend only upon radon alpha particle strikes on the photodetector array. During the second measurement the intake air filter is removed, so that both radon and daughter products are permitted to enter the interior chamber. Consequently, alpha particles from both radon and daughter products contribute to the total response of the photodiode array. Subtracting the first measurement value from the second yields daughter product concentration.

DETAILED DESCRIPTION

Figure 1:
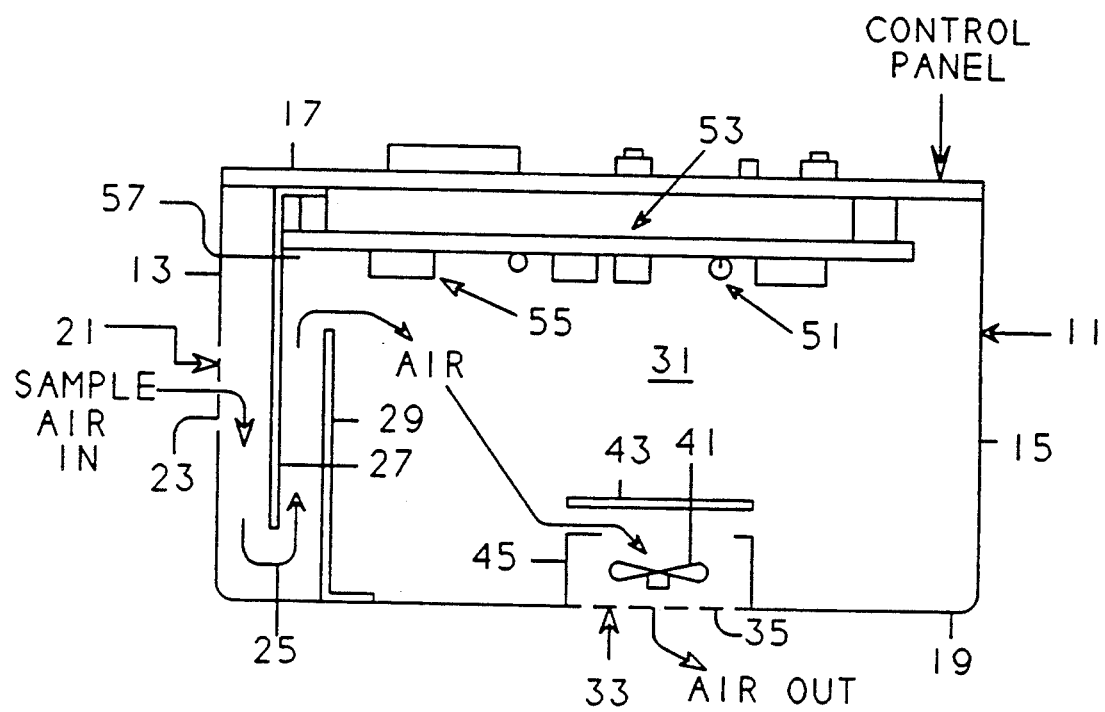
FIG. 1 a diagrammatic side view of preferred embodiment of a radon gas detector in accordance with the present invention.

Referring to FIG. 1 a diagrammatic side view of preferred embodiment of a radon gas detector in accordance with the present invention is shown as comprising a housing 11 in the form of a generally rectangular shell structure having four sidewalls, two of which 13 and 15 are shown, a control panel or top plate 17 and a bottom wall or floor 19. An air inlet port 21 in the form of a circular or rectangular aperture is provided in sidewall 13 and is covered with an electrically conductive (e.g. metallic) mesh or screen-configured filter 23. As pointed out previously, because mesh filter 23 is electrically conductive, it readily traps radon daughter products (e.g. ionic Po-218, Po-214) in air entering through air inlet port 21, before these daughter products can enter into the interior chamber of the housing. In addition, because the filter has a mesh configuration (e.g. one having a mesh opening size of 10-20 microns), it permits substantial air flow through the openings in the mesh. (In a conventional diffusion based radon detector, such as the previously referenced Honeywell device, daughter products are trapped by way of a dense fiber (paper) filter in which air flow openings are very fine, on the order of only 0.8 microns. In effect such a conventional filter traps daughter products by mechanical blockage during diffusion of the ambient air into the measurement chamber of the device.)

Air inlet port 21 opens into a serpentine passageway 25 defined by an arrangement of light-obstructing baffles 27, 29, which lead to an interior radiation measurement chamber 31. The baffles effectively close off or shield the interior chamber 31 from light outside the housing while, at the same time permitting air to readily flow into the interior chamber through air inlet port 21.

The walls of the baffles preferably have flat black surfaces in order to reduce internal light reflection. The length of air passageway 25 defined by the walls of light obstructing baffles 27, 29 is in excess of its widthwise dimension, so as to effectively prevent the entry of ambient light into the interior chamber by way of the air inlet port.

Interior chamber 31 is also coupled to an air exhaust port 33 located in the bottom wall 19 of the housing. Coupled with air exhaust port 33 is a second electrically conductive mesh filter 35. Like filter air inlet filter 23, filter 35 preferably has an electrically conductive (e.g. metallic) mesh or screen-configured configuration, so that it readily traps radon daughter products (ions) in air entering the interior chamber through air exhaust port 33 and permits substantial air flow through the openings in the mesh, thereby facilitating the active circulation of ambient air through the interior chamber. Filter 35 may also have a mesh opening size of 10-20 microns.

To actively draw air into the interior chamber of the radon detector, a forced air movement device, such as a low volume exhaust fan 41, is mounted in the air flow path from interior chamber 31 to exhaust port 33. Fan 41 may be mounted adjacent to exhaust port 33 at the bottom wall of the housing, as shown. In order to shield interior chamber 31 from the entry of light by way of exhaust port 33, a light-obstructing baffle structure 43 is provided in the air flow path from the interior chamber past fan 41. For this purpose, baffle structure 43 may be arranged adjacent to a fan shroud 45.

To measure radon concentration in the air drawn into being circulated through interior chamber 31, a radiation detector circuit 51 is mounted on a circuit board 53, shown as being supported directly beneath top plate 17 within interior chamber 31. Radiation detector circuit 51, to be described below with reference to FIG. 2, employs, as its radiation sensitive component, a large area open photodiode array 55, which is installed in the vicinity of baffle outlet 57, so that photodiode array 55 may be exposed to radiation (e.g. incident alpha particle emissions) from the radon gas and daughter products as it is drawn through interior chamber 31.

Figure 2:
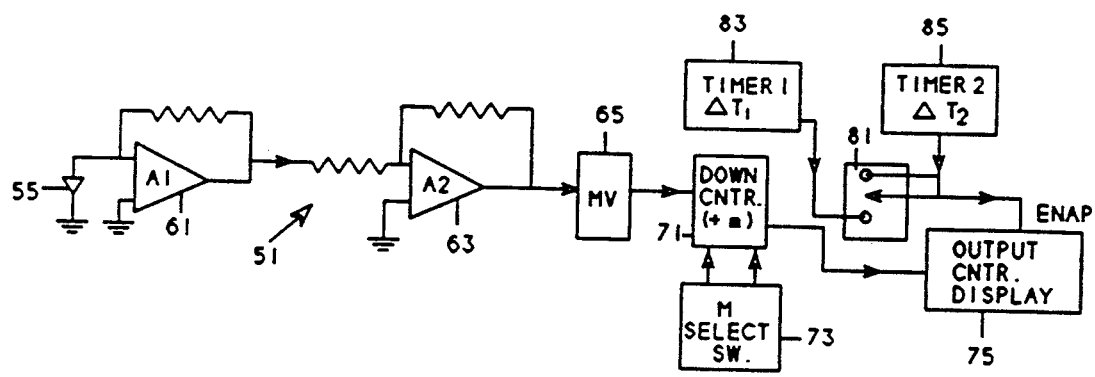
FIGS. 2 and 3 are respective schematic diagrams of radiation detector circuits that may be employed in the radon detector of FIG. 1.

Referring to FIG. 2, radiation detector circuit 51 includes photodiode array 55 which is coupled in circuit with an input amplifier 61. Input amplifier 61 converts output current produced by photodiode array 55 (in response to alpha particle impingement) to (millivolt range) voltage pulses. The output of amplifier 61 is cascaded with amplifier 63, which amplifies the (alpha particle representative) pulse output of amplifier 61 to a five volt voltage level. The output of amplifier 63 is coupled to a (one-shot) monostable multivibrator 65, which shapes the voltage pulses into square wave type pulses of five volts amplitude and a pulse width on the order of two to six milliseconds.

The output of multivibrator 65 is coupled to a divide-by-n down counter 71, 'n' being selectable by way of an associated set of selector switches 73. Down counter 71 divides the raw alpha particle representative pulse signal by a value established by the setting of switches 73 during calibration. The output of down counter 71 is coupled to an output counter having an associated counter display 75. Coupled to output counter 75 through a selector switch 81 are respective first and second timer circuits 83 and 85. Timer circuit 83, when coupled to output counter 75 by selector switch 81, enables the output counter for a preset period of time. Thus the settings of selector switches 73 and timing circuit 83 determine the calibration of the radon detector.

Timing circuit 85 is set for a substantially longer period of time which is a multiple of the basic measurement interval defined by timing circuit 83. Using counter 85 to control the operation of counter 75 allows radon measurements to be conducted over a longer period of time, so that daily variations may be average over a period such as a week, months, etc.

Figure 3:
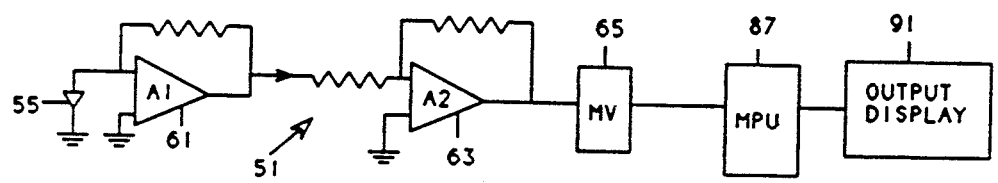

It should be realized that the signal processing functionality of the counter and timing circuits of FIG. 2 may, alternatively, be carried out by an integrated circuit incorporating microprocessor-based control circuit (micro-controller) 87, which monitors the output of multivibrator 71. The output of such a micro-controller may be coupled to an output display unit 91, as shown in FIG. 3, to provide a measurement of radon in pico Curies per liter. With the forced air flow and filter structure described above, the response time, or the time required for a good measurement is about 6 hours, as opposed to 24 to 48 hours required by a conventional diffusion based system, such as the previously referenced Honeywell detector.

In order to calibrate the radon detector, its sensitivity is initially determined by placing the radon detector in an atmosphere of known radon concentration and then reading alpha particle count per pCi/1 concentration of radon. For example, the radon detector may be placed in a chamber having a known radon [Rn] concentration of 10pCi/1. Observing a total of 150 counts in a 48 hour period (dT) yields a sensitivity S of:

$$S=(dN/dT)/pCi/1=N/[Rn]dT=150/10\times 48=0.31 \text{ counts/hr/pCi/1}.$$

With this sensitivity a measurement period of 12.9 hours or longer is required to obtain a count N of 16 or more counts with a threshold concentration of 4pCi/1. Setting the measurement interval dT=12.9 hours yields a count value N of:

$$N=[Rn]dT(N/pCi/1=10\times 12.9\times 0.31=40.$$

To convert counts to pCi/1, N must be divided by an integer greater than 2, which is accomplished by setting downcounter 71 to n. Thus, to yield a concentration of 10pCi/1, n must be set to 4.

$$[Rn]=N/n=40/4=10pCi/1.$$

With the measurement interval dT set to 12.9 hours and n set equal to 4, the radon detector is now calibrated.

As noted above, in addition to the ability to measure radon concentration based upon incidence of alpha particles emitted by radon upon the photodiode array, the present invention also has the capability of determining daughter product concentration. For this purpose, two measurements are conducted, the first with intake filter 23 in place (fixed exhaust port filter 35 is also in place), and the second with intake filter 23 removed. During the first measurement, photodiode array 55 responds only to the presence of alpha particles from radon, so that a measured count value provided by attendant processing circuit 51 will depend only upon alpha particle strikes. During the second measurement, however, with filter 23 removed, alpha particles from radon and daughter products are permitted to enter interior chamber 31, so that alpha particles from daughter products also thus contribute to the total response of the photodiode array. Thus, subtracting the first measurement value from the second yields daughter product concentration.

As an illustration, consider the measurement of radon daughter products Po-218 and Po-214 concentration in working level units (WL $=k(dN_2/dT-dN_1/dT)$), by measuring the alpha disintegration rate with filters 23 and 35 in place and again with intake filter 23 removed in a chamber of known WL. The two count rates are subtracted from one another and the constant k is determined as:

$$k = \text{known } WL/dN_2/dT - dN_1/dT.$$

This procedure is repeated in an area of unknown daughter product concentration and WL is determined as $WL=k(dN_2/dT-dN_1/dT)$, where 1 $WL=1.3\times 10E5$ MeV/l.

As will be appreciated from the foregoing description, by virtue of a novel filtering and forced air flow structure, the radon detector of the present invention is a relatively low cost device, using reduced complexity sensor and circuitry components that readily lend themselves to microminiaturized fabrication. (The detector requires only three "C" cell batteries.) The invention also removes the need for a skilled operator, but is capable of relatively fast measurement, enjoys high measurement precision, and is capable of measuring both radon concentration in pCi/l and radon daughter product concentration in WL. The use of an electrically conductive mesh filter, by allowing large air flow rates through the system, permits ambient air under test to be actively circulated into a large detector chamber area that can house a large photodiode array necessary for approximately a 6 hour measurement even at low radon concentrations (4 pCi/l with $\pm 25\%$ standard error). When the electrically conductive filters at the air inlet and exhaust ports are in place, they limit entry to radon gas only and exclude daughter products (Po218 and Po214) from entering the instrument, when radon concentration is measured in pCi/l.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A radon gas measurement apparatus comprising:
   a housing having an air inlet port, said air inlet port leading to an interior chamber which is closed to the entry of ambient light, and an air outlet port;
   an electrically conductive daughter product filter through which air entering said air inlet port passes in the course of its movement to said interior chamber, said electrically conductive daughter product filter being comprised of conductive material which traps Po-214 and Po-218 daughter products in air passing therethrough, said electrically conductive daughter product filter having openings therethrough that are sized to allow air and radon gas present in said air to pass therethrough into said interior chamber, but to allow entry of no Po-214 and Po-218 daughter products therethrough into said interior chamber; and a radiation detector disposed within said interior chamber and being operative to detect alpha particle radiation emitted by radon gas within air that has passed through said electrically conductive daughter product filter and entered said interior chamber and from which any Po-214 and Po-218 daughter products have been removed by said electrically conductive daughter product filter.

2. A radon gas measurement apparatus according to claim 1, wherein said openings in said electrically conductive daughter product filter have an opening size of 10-20 microns.

3. A radon gas measurement apparatus according to claim 1, wherein said electrically conductive daughter product filter comprises an electrically conductive mesh type tiler having a mesh opening size of 10-20 microns.

4. A radon gas measurement apparatus according to claim 1, wherein said radiation detector comprises a photodiode detector which produces output pulses in response to alpha particle impingement thereon, the output pulses produced by said photodiode detector being coupled to a pulse counting device which counts output pulses produced by said photodiode detector over a selectable period of time and provides an output representative of the number of alpha particles impingements upon said photodiode detector per unit of time.

5. A radon gas measurement apparatus according to claim 1, wherein said openings in said electrically conductive daughter product filter have an opening size no greater than 20 microns, and further comprising an exhaust fan coupled with an air outlet port of said housing and being operative to effect a controlled flow of air through said air inlet port and said electrically conductive daughter product filter, into said interior chamber and exhausted by way of said air outlet port, and wherein said housing has a first light obstructing structure leading from said air inlet port leading to said interior chamber, said first light obstructing structure having an air passageway whose length is in excess of a widthwise dimension thereof, so as to effectively prevent the entry of ambient light into said interior chamber by way of said aid inlet port, and wherein said radiation detector comprises a photodiode detector device which generates an output in response to the incidence of alpha particles emitted by radon gas that has been drawn through said electrically conductive daughter product filter into said interior chamber, said housing has a second light obstructing structure disposed between said interior chamber and said air outlet port, said second light obstructing structure effectively preventing the entry of ambient light into said interior chamber by way of said air outlet port, and wherein said radiation detector comprises a photodiode detector which produces output pulses in response to alpha particle impingement thereon, the output pulses produced by said photodiode detector being coupled to a pulse counting device which counts output pulses produced by said photodiode detector over a selectable period of time and provides an output representative of the number of alpha particles impingements upon said photodiode detector per unit of time.

6. A radon gas measurement apparatus according to claim 1, further comprising an additional electrically conductive daughter product filter disposed between said air outlet port and said interior chamber, said additional electrically conductive daughter product filter being comprised of conductive material having openings therein that are sized to allow air and radon gas present in said air to pass therethrough into said interior chamber, but to allow entry of no Po-214 and Po-218 daughter products therethrough into said interior chamber, so that any such Po-214 and Po-218 daughter products present in the air exterior to said radon gas measurement apparatus do not enter said interior chamber through said air outlet port.

7. A radon gas measurement apparatus according to claim 6, wherein said openings in said additional electrically conductive daughter product filter have an opening size of 10-20 microns.

8. A radon gas measurement apparatus according to claim 6, wherein said additional electrically conductive daughter product filter comprises an electrically conductive mesh type filter having a mesh opening size of 10-20 microns.

9. A method of measuring the content of radon gas in air comprising the steps of:
   (a) causing air to pass through an electrically conductive daughter product filter into a chamber, said electrically conductive daughter product filter comprising conductive material which traps daughter products contained in air passing thereby, said electrically conductive daughter product filter having openings through which said air passes, said openings being sized to allow said air and radon gas present in said air to pass therethrough into said chamber, but to allow entry of no Po-214 and Po-218 daughter products therethrough into said chamber; and
   (b) detecting, within said chamber, the emission of alpha particles by radon gas that has entered said chamber through said openings in said electrically conductive daughter product filter, and from which radon gas any Po-214 and Po-218 daughter products have been removed in step (a) by said electrically conductive daughter product filter.

10. A method according to claim 9, wherein said openings in said electrically conductive daughter product filter have an opening size of 10-20 microns.

11. A method according to claim 9, wherein said electrically conductive daughter product filter comprises an electrically conductive mesh type filter having a mesh opening size of 10-20 microns.

12. A method according to claim 9, wherein said chamber has an exhaust port to which a forced air movement device is coupled, an wherein step (a) comprises operating said forced air movement device to effect a controlled flow of air through said electrically conductive daughter product filter, into said chamber and then exhausted therefrom exhausted by way of said air exhaust port, and wherein step (b) comprises causing air passing onto said chamber to impinge upon a photodiode detector device which generates an output in response to the incidence of alpha particles emitted by radon gas that has been drawn through said electrically conductive daughter product filter into said chamber, said photodiode detector producing output pulses in response to alpha particle impingement thereon, the output pulses produced by said photodiode detector being coupled to a pulse counting device which counts output pulses produced by said photodiode detector over a selectable period of time and provides an output representative of the number of alpha particles impingements upon said photodiode detector per unit of time.

13. A method of measuring the radon daughter product content of radon gas in air comprising:

(a) passing air through an electrically conductive daughter product filter into a chamber which is closed to the entry of ambient light, said electrically conductive daughter product filter being comprised of conductive material having openings therethrough that are sized to allow air and radon gas present in said air to pass therethrough into said chamber, but to allow entry of no Po-214 and Po-218 daughter products therethrough into said chamber;

(b) detecting, within said chamber, radiation within radon gas that has passed into said chamber free from any Po-214 and Po-218 daughter products as a result of Po-214 and Po-218 daughter products being trapped by said electrically conductive daughter product filter, and providing a measure of the detected radiation;

(c) removing said electrically conductive daughter product filter;

(d) passing air into said chamber;

(e) detecting, within said chamber, radiation within radon gas and Po-214 and Po-218 daughter products that have passed into said chamber in step (d) and providing a measure of the detected radiation; and (f) taking the difference between the measurements carried out in steps (b) and (e), so as to obtain a value representative of a measurement of Po-214 and Po-218 radon daughter products.

14. A method according to claim 13, wherein steps (a) and (d) comprise actively forcing the movement of air into and through said chamber, and exhausting air from said chamber.

* * * * *